US012488238B2

United States Patent
Cheng et al.

(10) Patent No.: US 12,488,238 B2
(45) Date of Patent: *Dec. 2, 2025

(54) INFORMATION-AWARE GRAPH CONTRASTIVE LEARNING

(71) Applicant: NEC Laboratories America, Inc., Princeton, NJ (US)

(72) Inventors: Wei Cheng, Princeton Junction, NJ (US); Dongkuan Xu, State College, PA (US); Haifeng Chen, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 741 days.

This patent is subject to a terminal disclaimer.

(21) Appl. No.: 17/728,071

(22) Filed: Apr. 25, 2022

(65) Prior Publication Data

US 2022/0383108 A1 Dec. 1, 2022

Related U.S. Application Data

(60) Provisional application No. 63/316,505, filed on Mar. 4, 2022, provisional application No. 63/191,367, filed on May 21, 2021.

(51) Int. Cl.
*G06N 3/08* (2023.01)
(52) U.S. Cl.
CPC ..................... *G06N 3/08* (2013.01)
(58) Field of Classification Search
CPC .......... G06N 3/08; G06N 3/0895; G06N 3/09; G06N 3/091; G06N 3/092; G06N 3/094;
(Continued)

(56) References Cited

U.S. PATENT DOCUMENTS 5,289,303 A * 2/1994 Cloonan ............ H04Q 11/0001
370/400
2017/0124711 A1* 5/2017 Chandraker ........... G06N 3/045
(Continued)

FOREIGN PATENT DOCUMENTS

WO WO-2017031356 A1 * 2/2017 ............. G06N 10/00

OTHER PUBLICATIONS

Glocalized Weisfeiler—Lehman Graph Kernels: Global—Local Feature Maps of Graphs—Morris et al. (Year: 2017).*
(Continued)

*Primary Examiner* — KC Chen
(74) *Attorney, Agent, or Firm* — Vincent Duffy; Joseph Kolodka

(57) ABSTRACT

A method for performing contrastive learning for graph tasks and datasets by employing an information-aware graph contrastive learning framework is presented. The method includes obtaining two semantically similar views of a graph coupled with a label for training by employing a view augmentation component, feeding the two semantically similar views into respective encoder networks to extract latent representations preserving both structure and attribute information in the two views, optimizing a contrastive loss based on a contrastive mode by maximizing feature consistency between the latent representations, training a neural network with the optimized contrastive loss, and predicting a new graph label or a new node label in the graph.

20 Claims, 8 Drawing Sheets

(58) Field of Classification Search
CPC ...... G06N 3/096; G06N 3/098; G06N 3/0985;
G06N 3/0464; G06N 5/027; G06N 5/022;
G06N 3/045
See application file for complete search history.

(56) References Cited

U.S. PATENT DOCUMENTS

| | | | |
|---|---|---|---|
| 2019/0034798 A1* | 1/2019 | Yu | G06N 3/045 |
| 2019/0095806 A1* | 3/2019 | Martinez Canedo | G06F 18/21 |
| 2020/0242507 A1* | 7/2020 | Gan | G06V 10/82 |
| 2021/0064931 A1* | 3/2021 | Yang | G06V 20/46 |
| 2021/0110262 A1* | 4/2021 | Schmitt | G06N 3/045 |
| 2021/0326660 A1* | 10/2021 | Krishnan | G06F 18/214 |
| 2022/0156591 A1* | 5/2022 | Li | G06V 10/82 |

OTHER PUBLICATIONS

Kipf, Thomas N. and Max Welling, "Semi-supervised classification with graph convolutional networks." arXiv preprint arXiv:1609.02907v4, Feb. 22, 2017, pp. 1-14.
Veličković, Petar, et al. "Graph attention networks." arXiv preprint arXiv:1710.10903v3, Feb. 4, 2018, pp. 1-12.
Xu, Keyulu, et al. "How powerful are graph neural networks?" arXiv preprint arXiv:1810.00826v3, Feb. 22, 2019, pp. 1-17
Hamilton, Will, Zhitao Ying, and Jure Leskovec, "Inductive representation learning on large graphs." Advances in neural information processing systems 30, 2017, pp. 1-11.
Yuning You et al., "Graph contrastive learning with augmentation", arXiv:201, 13902v3 [cs.LG], pp. 1-12, Apr. 2021 (see pp. 1, 4; and figure 1).

* cited by examiner

INFORMATION-AWARE GRAPH CONTRASTIVE LEARNING

RELATED APPLICATION INFORMATION

This application claims priority to Provisional Application No. 63/191,367 filed on May 21, 2021, and Provisional Application No. 63/316,505 filed on Mar. 4, 2022, the contents of both of which are incorporated herein by reference in their entirety.

BACKGROUND

Technical Field

The present invention relates to graph contrastive learning models and, more particularly, to information-aware graph contrastive learning.

Description of the Related Art

Inspired by their success in the vision and language domains, contrastive learning methods have been wildly adopted by recent progress in graph learning to improve the performance of a variety of tasks. In a nutshell, these methods usually learn representations by creating two augmented views of a graph and maximizing the feature consistency between the two views. Inheriting the advantages of self-supervised learning, contrastive learning relieves graph representation learning from its reliance on label information in the graph domain, where label information can be very costly or even impossible to collect while unlabeled/partially labeled data is common, such as chemical graph data. Graph contrastive learning methods have achieved similar, and even better performance as compared to the equivalent methods trained with labels on benchmark graph datasets.

SUMMARY

A method for performing contrastive learning for graph tasks and datasets by employing an information-aware graph contrastive learning framework is presented. The method includes obtaining two semantically similar views of a graph coupled with a label for training by employing a view augmentation component, feeding the two semantically similar views into respective encoder networks to extract latent representations preserving both structure and attribute information in the two views, optimizing a contrastive loss based on a contrastive mode by maximizing feature consistency between the latent representations, training a neural network with the optimized contrastive loss, and predicting a new graph label or a new node label in the graph.

A non-transitory computer-readable storage medium comprising a computer-readable program for performing contrastive learning for graph tasks and datasets by employing an information-aware graph contrastive learning framework is presented. The computer-readable program when executed on a computer causes the computer to perform the steps of obtaining two semantically similar views of a graph coupled with a label for training by employing a view augmentation component, feeding the two semantically similar views into respective encoder networks to extract latent representations preserving both structure and attribute information in the two views, optimizing a contrastive loss based on a contrastive mode by maximizing feature consistency between the latent representations, training a neural network with the optimized contrastive loss, and predicting a new graph label or a new node label in the graph.

A system for performing contrastive learning for graph tasks and datasets by employing an information-aware graph contrastive learning framework is presented. The system includes a memory and one or more processors in communication with the memory configured to obtain two semantically similar views of a graph coupled with a label for training by employing a view augmentation component, feed the two semantically similar views into respective encoder networks to extract latent representations preserving both structure and attribute information in the two views, optimize a contrastive loss based on a contrastive mode by maximizing feature consistency between the latent representations, train a neural network with the optimized contrastive loss, and predict a new graph label or a new node label in the graph.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Despite being effective and prevalent, existing graph contrastive learning models differ mostly in augmented view design, encoding architecture, and contrastive objective. For a learning task, graph contrastive learning models usually need a substantial degree of domain expertise to carefully design and customize these modules for specific datasets. For example, while both Deep Graph Infomax (DGI) and InfoGraph seek to obtain graph representations by maximizing the mutual information between patch-level and graph-level representations, they adopt different graph encoders, Graph Convolutional Network (GCN) and Graph Isomorphism Network (GIN), respectively. mvgrl applies graph diffusion convolution to construct the augmented view, while GCC and GRACE adopt subgraph sampling and graph perturbation, respectively.

The main question the exemplary embodiments attempt to answer is: how to perform contrastive learning for learning tasks on specific graph datasets? However, answering this question is challenging. First, contrastive learning includes multiple components, such as view augmentation and information encoding. For each of them, there are various choices. Numerous variations make it difficult to design models that are both robust and efficient. Existing graph contrastive learning approaches are carefully designed for different learning tasks on different datasets, however, none of them studies the guiding principles for choosing the best components. Second, graph data has unique properties that distinguish such data from other types of data, such as rich structural information and highly diverse distribution. Thus, it is desirable to design the contrastive learning model that fits the specific graph data properties, even without any domain knowledge of the data.

The exemplary embodiments propose to address these challenges via the Information Bottleneck (TB), which provides an important principle for representation learning. Specifically, IB encourages the representations to be maximally informative about the target in the downstream task, which helps keep task-relevant information. Concurrently, IB discourages the representation learning from acquiring the task-irrelevant information from the input data, which is related to the idea of minimal sufficient statistics. However, different from representation learning, there are two information flows involved in the two augmented views in contrastive learning. Therefore, the exemplary methods extend the previous IB work and propose InfoGCL, an information-aware contrastive learning framework for graph data.

Figure 1:
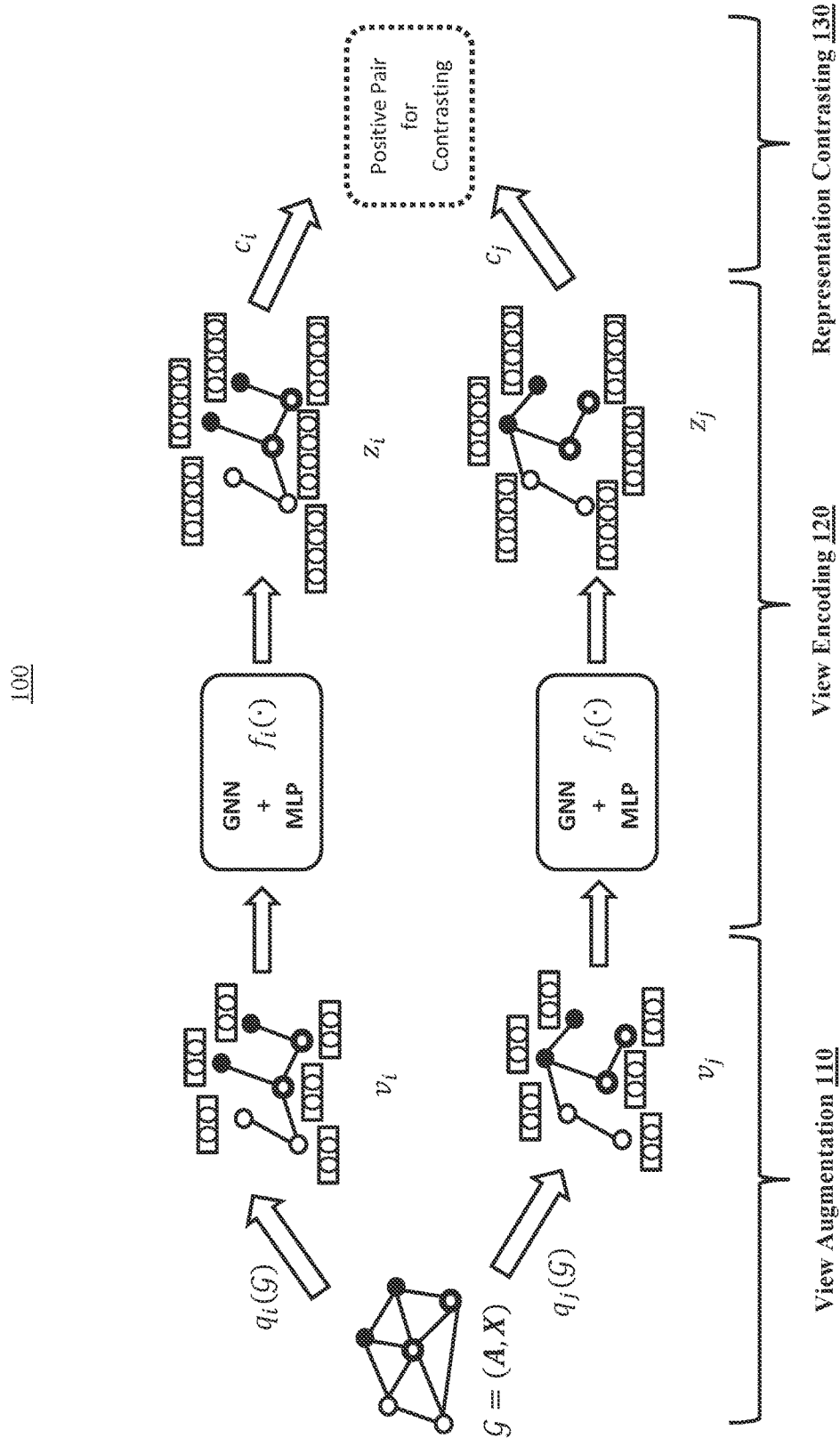
FIG. 1 is a block/flow diagram of an exemplary graph contrastive learning framework including three stages, that is, a view augmentation stage, a view encoding stage, and a representation contrasting stage, in accordance with embodiments of the present invention.

To study how information is transformed and transferred, the exemplary methods decouple a graph contrastive learning model 100 into three sequential modules, as shown in FIG. 1. The modules or components include a view augmentation component 110, a view encoding component 120, and a representation contrasting component 130. The exemplary methods further formalize how to find the optimal of the three modules 110, 120, 130 into three optimization problems. To build the optimal graph contrastive learning model for the particular dataset and task, it is argued that it is necessary and sufficient to minimize the mutual information between contrastive representations while maximizing task-relevant information at the levels of both individual module and entire framework. The exemplary methods are also motivated by the InfoMin theory, which suggests that a good set of views for contrastive learning in the vision domain should share the minimal information necessary to perform well at the downstream task. Beyond view selection, the exemplary methods extend InfoMin to suggest principles of selecting view encodings and contrastive modes for graph learning considering the unique properties of graph data.

The exemplary embodiments suggest practically feasible principles to find the optimal modules in graph contrastive learning and show that all recent graph contrastive learning methods can be unified by these principles, that is, the augmented views should include as much task-relevant information as possible, while they should share as little information as possible, the view encoder should be task-relevant and as simple as possible, and the contrastive mode should keep task-relevant information as much as possible after contrasting. The role of negative samples in graph contrastive learning is also investigated and it is argued that negative samples are not necessarily needed, especially when graph data is not extremely sparse. The proposed method, InfoGCL, is validated on a rich set of benchmark datasets for both node-level and graph-level tasks, where its ability to capture the unique structural properties of the graph data is analyzed.

Regarding graph representation learning, a graph is denoted by $\mathcal{G}=(A, X)$. $A \in \mathbb{R}^{n \times n}$ is the adjacency matrix. $X \in \mathbb{R}^{n \times d}$ is the node attribute matrix, where d is the attribute dimension. The exemplary methods focus on both node-level and graph-level tasks. For a node-level task, given graph $\mathcal{G}$ and the labels of a subset of nodes, denoted by $Y_v$, the goal is to learn the latent representation $z_v$ for each node v such that $z_v$ preserves both network structures and node attributes, which can be further used to predict $Y_v$. For a graph-level task, given a set of graphs $\mathcal{G}=\{\mathcal{G}^1, \mathcal{G}^2, \ldots\}$ and the labels of some graphs, denoted by $Y_\mathcal{G}$, the goal is to learn the latent representation $z_g$ for each graph such that $z_g$ can be used to predict $Y_g$. Usually, the graph data is fed into graph neural networks (GNNs) to generate the representations, such as $z_g$=GNNs($\mathcal{G}$).

Regarding graph contrastive learning, given an input graph, graph contrastive learning aims to learn the representations of graphs or nodes (for graph-level or node-level tasks, respectively) by maximizing the feature consistency between two augmented views of the input graph via contrastive loss in the latent space. The exemplary methods decouple a graph contrastive learning model into three sequential modules 110, 120, 130.

Regarding the view augmentation component 110, graph z¢undergoes data augmentation q(•) to obtain two views $v_i$, $v_j$, e.g., $v_i \sim q_i(\mathcal{G})$ and $v_j \sim q_j(\mathcal{G})$. A view is represented as graph data, such as $v_i=(Av_i, Xv_i)$, where $Av_i \in \mathbb{R}^{n \times n}$ and $Xv_i \in \mathbb{R}^{n \times d}$. In practice, view augmentation approaches include node dropping, edge perturbation, subgraph sampling, etc.

Regarding the view encoding component 120, graph-level or node-level latent representation is extracted from views $v_i$, $v_j$ by using the view encoder networks f(•) (a GNN backbone plus a projection multilayer perceptron (MLP)), e.g., $z_i \sim f_i(v_i)$ and $z_j \sim f_j(v_j)$. The two encoders might or might not share parameters depending on whether they are from the same domain.

Regarding the representation contrasting component 130, given the latent representations, a contrastive loss is optimized to score the positive pairs $z_i$, $z_j$ higher compared to other negative pairs. Usually, the negative pairs are constructed from the augmented views of other graphs in the same minibatch.

The InfoNCE loss has been adopted as one of popular contrastive losses, which is defined as:

$$\mathcal{L}_{NCE} = -\mathbb{E}\left[\log \frac{\exp(h(z_{i,n}, z_{j,n}))}{\sum_{n'=1}^{N} \exp(h(z_{i,n}, z_{j,n'}))}\right]$$

where h(•) is a contrasting operation to score the agreement between two representations. Theoretically, minimizing the InfoNCE loss equivalently maximizes a lower bound on the mutual information between the views of positive pairs. In other words, $I(z_i, z_j) \geq \log(N) - L_{NCE}$, where I(•) measures the mutual information.

The exemplary methods study how to perform contrastive learning for specific graph tasks and datasets. In particular, the exemplary methods attempt to answer the following questions for graph contrastive learning: What is the optimal augmented views? What is the optimal view encoder? and What is the optimal contrastive mode?

Regarding view augmentation, the goal of view augmentation is to generate realistically rational data via the transformation approaches that do not affect the semantic label. Compared to the augmentation in other domains, graph view augmentation needs to consider the structural information of graph data, such as the node, the edge, and the subgraph. There are various graph view augmentation methods. The exemplary methods categorize four kinds of view augmentation approaches for graph data. Node dropping discards a certain part of nodes along with their edges in the input graph to create or generate a new graph view. Edge perturbation perturbs the connectivity in the graph by adding or dropping partial edges. Attribute masking masks part of node attributes and assumes that the missing attributes can be well predicted by the remaining ones. Subgraph sampling samples a subgraph from the input graph. The rationale behind these approaches is that the semantic meaning of the graph has certain robustness to graph perturbation.

The augmented views generated in the graph contrastive framework are usually used in a separate downstream task. To characterize what views are optimal for a downstream task, the exemplary methods define the optimality of views. The main motivation is that the optimal augmented views should include the most task-relevant information, and the information shared between views should only be task-relevant.

With respect to corollary 1, optimal augmented views, for a downstream task T whose goal is to predict a semantic label y, the optimal views, $v_i^*, v_j^*$, generated from the input graph $\mathcal{G}$ are the solutions to the following optimization problem:

$$(v_i^*, v_j^*) = \underset{v_i, v_j}{\arg\min} I(v_i; v_j)$$
$$\text{s.t. } I(v_i; y) = I(v_j; y)$$
$$I(v_i; y) = I(\mathcal{G}; y)$$

This says that for the optimal graph views, the amount of information shared between them is minimized, while the two views include the same amount of information with respect to y, which is also the amount of information that the input graph includes about the task.

Regarding view encoding, view encoding aims to extract the latent representations of nodes or graphs by feeding the data of two views into the encoder networks such that the generated representations preserve both structure and attribute information in the views. The view encoders are flexible in graph contrastive learning and usually they are GCN, Graph Attention Network (GAT), or GIN, etc.

The representations extracted by the view encoding are further utilized to optimize the objective function of contrastive learning. After being well trained, the view encoders are used to generate the graph/node representations for a downstream task. To characterize what encoders are optimal, the exemplary methods define the optimality of view encoders for graph contrastive learning. The main motivation is that the representation generated by the optimal encoder for a view should keep all the shared information by the two contrastive views, meanwhile the kept information is all task-relevant.

With respect to corollary 2, the optimal view encoder, given the optimal views, $v_i^*, v_j^*$, for a downstream task T whose goal is to predict a semantic label y, the optimal view encoder for view $v_i^*$ is the solution to the following optimization problem:

$$f_i^* = \underset{f_i}{\arg\min} I(f_i(v_i^*); v_i^*)$$
$$\text{s.t. } I(f_i(v_i^*); v_j^*) = I(v_i^*; v_j^*)$$

It indicates that for the optimal view encoder, the amount of information shared between the optimal view and the extracted representation is minimized, while the information shared between the two optimal views is kept after the encoding process of one view.

Regarding representation contrasting, to allow flexible contrasting for graph data, the exemplary methods consider contrastive modes. A contrastive mode is denoted by $(c_i(•), c_j(•))$, where $c_i(•)$, $c_j(•)$ are the aggregation operations applied to the representations extracted by view encoders. The contrastive modes are unique to graph data because of the structural information inside a graph. Specifically, the exemplary methods consider five contrastive modes. In global-global mode, the graph representations from two views are contrasted. Thus, $c_i(•)$, $c_j(•)$ are averaging aggregation operations in this mode. In local-global mode, the exemplary methods contrast the node representations from one view with the graph representations from the other view. Thus, $c_i(•)$, $c_j(•)$ are the identical transformation and averaging aggregation operations, respectively. In local-local mode, the node representations from two views are contrasted. In multi-scale mode, the exemplary methods contrast graph representation of one view with the intermediate representation from the other view. In hybrid mode, both global-global and local-global are applied.

To characterize which mode is optimal, the exemplary methods define the optimality of contrastive mode for graph contrastive learning. The main motivation is that the optimal contrastive mode keeps the most task-relevant information after the representations are aggregated.

With respect to corollary 3, the optimal contrastive mode, given the latent representations, $z_i^*, z_j^*$, extracted by the optimal view encoders, e.g., $z_i^* = f_i^*(v_i^*)$, $z_j^* = f_j^*(v_j^*)$, and a downstream task T with label y, the optimal contrastive mode is the solution to the following optimization problem, where $c_i, c_j$ are the aggregation operations applied to the latent representations:

$$(c_i^*, c_j^*) = \underset{(c_i, c_j)}{\arg\min} -I(c_i(z_i^*); c_j(z_j^*))$$

According to the proposed corollaries, the exemplary methods can theoretically design the optimal contrastive learning approach for the specific graph data and task. However, in real-world scenarios, the conditions to meet the exact optimality of contrastive learning is hard or even not practically possible to reach because of data noise and limited model capability. Therefore, the exemplary methods propose to achieve the optimal for each stage 110, 120, 130 independently and practically, which is an approximation to achieve the original optimality. Specifically, the exemplary methods make the following propositions to address the questions of the optimal views, optimal view encoder, and optimal contrastive mode.

With respect to proposition 1, for a task T with label y, given a bunch of graph view augmentation methods, $\{q_1(\cdot), q_2(\cdot), \ldots\}$, that create two views $v_i$, $v_j$, the recommended augmentation methods are the ones, $q_i(\cdot)$, $q_j(\cdot)$, that maximize $I(v_i; y)+I(v_j; y)-I(v_i; v_j)$.

With respect to proposition 2, given a task T with label y and a set of view encoders, $\{f_i^1(\cdot), f_i^2(\cdot), \ldots\}$, that generate representation $z_i$ by taking view $v_i$ as input, the recommended view encoder is the one that maximizes the mutual information between $v_i$, $z_i$ and y. Symmetrically the same for view $v_j$.

With respect to proposition 3, given a task T with label y, the extracted representations, $z_i$, $z_3$, and a set of aggregation operations, $\{c_1(\cdot), c_2(\cdot), \ldots\}$, the recommended contrastive mode is the one, $(c_i, c_j)$, that has the largest amount of mutual information between $c_i(z_i)$, $c_j(z_j)$ and y.

Regarding the role of negative samples, current graph contrastive learning approaches heavily depend on negative samples. However, recent progress of contrastive learning in the vision domain indicates that negative samples are not necessarily needed, of which the main benefit is to avoid careful treatment to retrieve the negative pairs.

To study the influence of negative samples on graph contrastive learning, the exemplary methods follow the framework of Simple Siamese (SimSiam) to revise the loss function shown in the equation below. The exemplary methods focus on both node and graph classification tasks.

$$\mathcal{L} = -\frac{1}{N}\sum_{n=1}^{N}\frac{z_{i,n}}{\|z_{i,n}\|} \cdot \frac{z_{j,n}}{\|z_{j,n}\|}$$

In conclusion, the exemplary methods propose InfoGCL 100, an information-aware graph contrastive learning framework for graph contrastive learning. Existing graph contrastive learning approaches are usually carefully designed. The exemplary methods aim to answer how to perform contrastive learning for learning tasks on specific graph data. The exemplary method decouples the contrastive learning approaches into three sequential modules 110, 120, 130 and provides the theoretical analysis for reaching the optimality. To address the questions of optimality in a practical way, the exemplary methods propose the InfoGCL principle 100, which is implicitly followed by all recent graph contrastive learning approaches. In addition, the exemplary methods explore the role of negative samples in graph contrastive learning and find negative samples are not necessarily needed.

Figure 2:
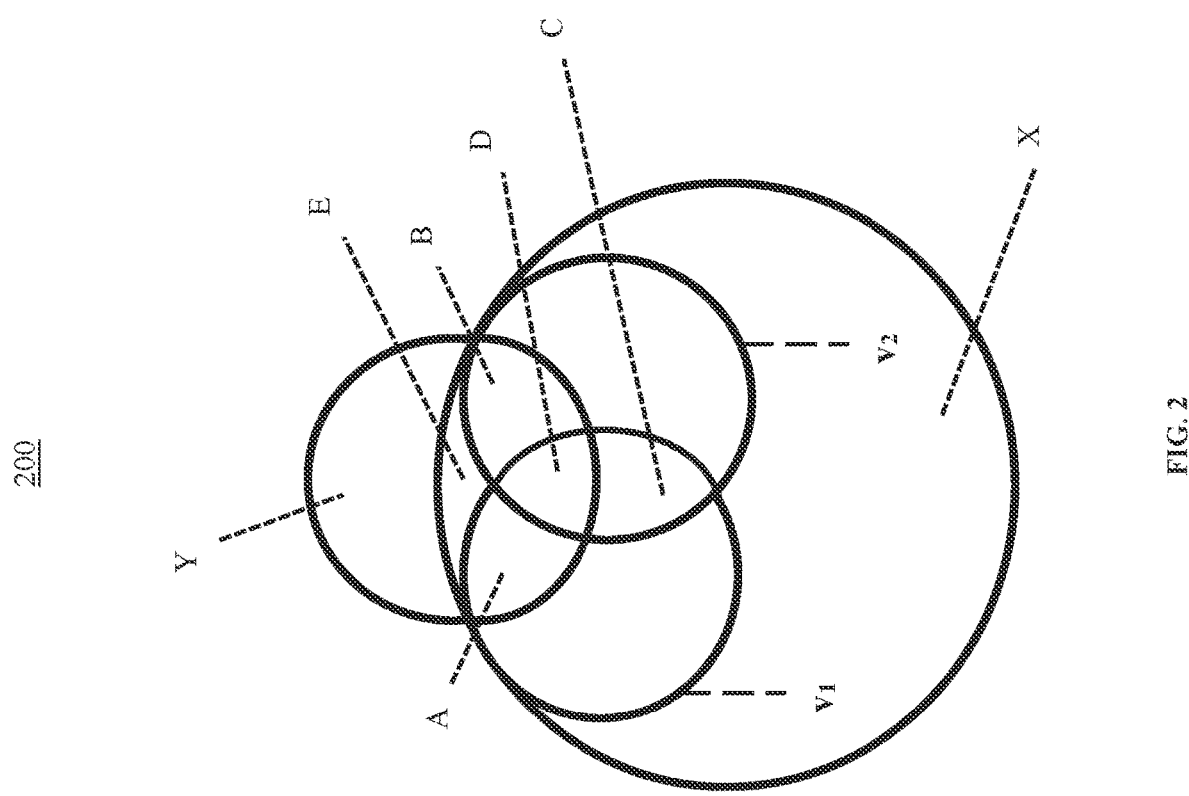
FIG. 2 is a block/flow diagram of an exemplary relationship between information of different parts in contrastive learning of a graph, in accordance with embodiments of the present invention.

FIG. 2 is a block/flow diagram of an exemplary relationship 200 between information of different parts in contrastive learning of a graph, in accordance with embodiments of the present invention.

x stands for the training data instances and y stands for the labels of the training data. $v_1$ and $v_2$ are two views of the graph data. A, B, C, D, E are the areas of the intersection of different parts, respectively. Then, the intuition is to increase $I(v_1; y)$, $I(v_2; y)$, etc., to increase the area size of A and B, and at the same time to decrease $I(v_1; v_2)$, that is, to decrease the areas of C and D.

Similarly, the exemplary methods can decrease $I(v_i; (y|z_i))$ to 0 and decrease $I(z_i; (v_i|y))$ to 0 so as to find the optimal encoder, such as GCN, GIN, GraphSAGE or GAT, etc. Additionally, the optimal contrastive mode can also be selected.

Figure 3:
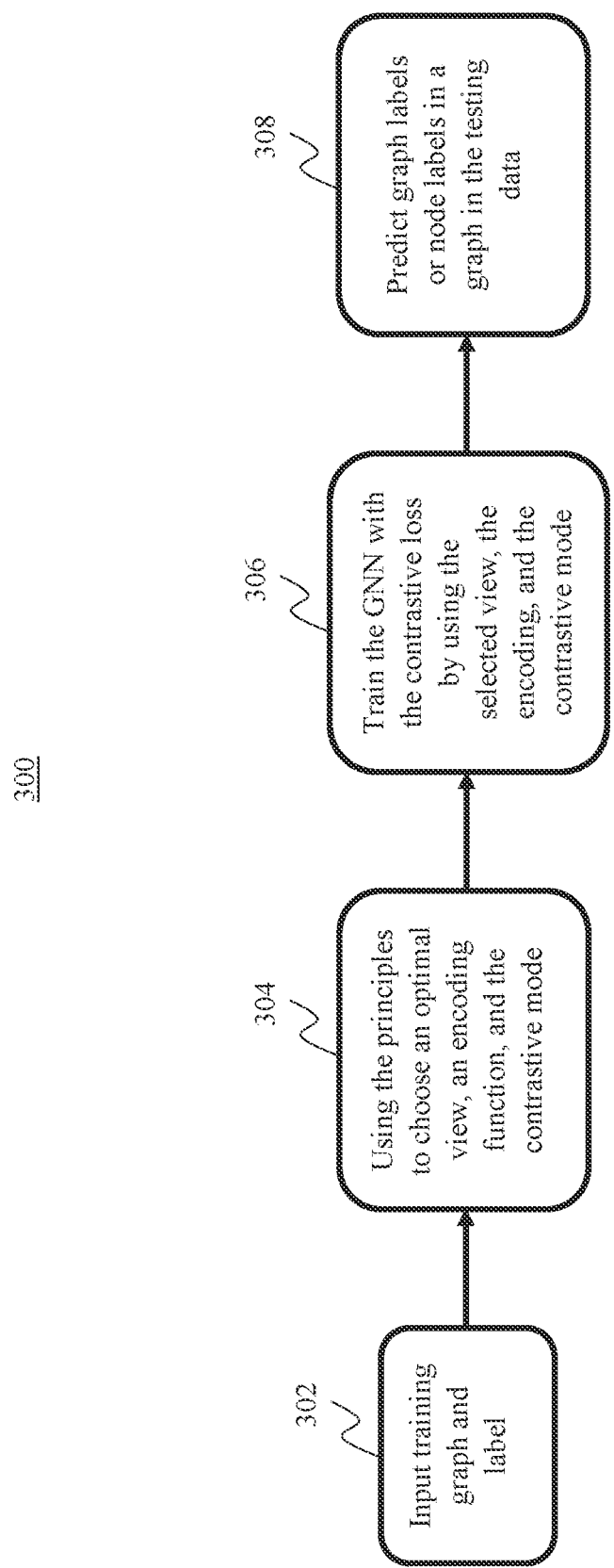
FIG. 3 is a block/flow diagram of an exemplary workflow to predict graph labels or node labels in a graph, in accordance with embodiments of the present invention.

FIG. 3 is a block/flow diagram of an exemplary workflow 300 to predict graph labels or node labels in a graph, in accordance with embodiments of the present invention.

At block 302, the training graph with corresponding label is input.

At block 304, the principles are used to choose an optimal view, an encoding function, and the contrastive mode.

At block 306, the graph neural network (GNN) is trained with the contrastive loss by using the selected view, the encoding function, and the contrastive mode.

At block 308, the graph labels or the node labels in the graph (of the testing data) are predicted.

Figure 4:
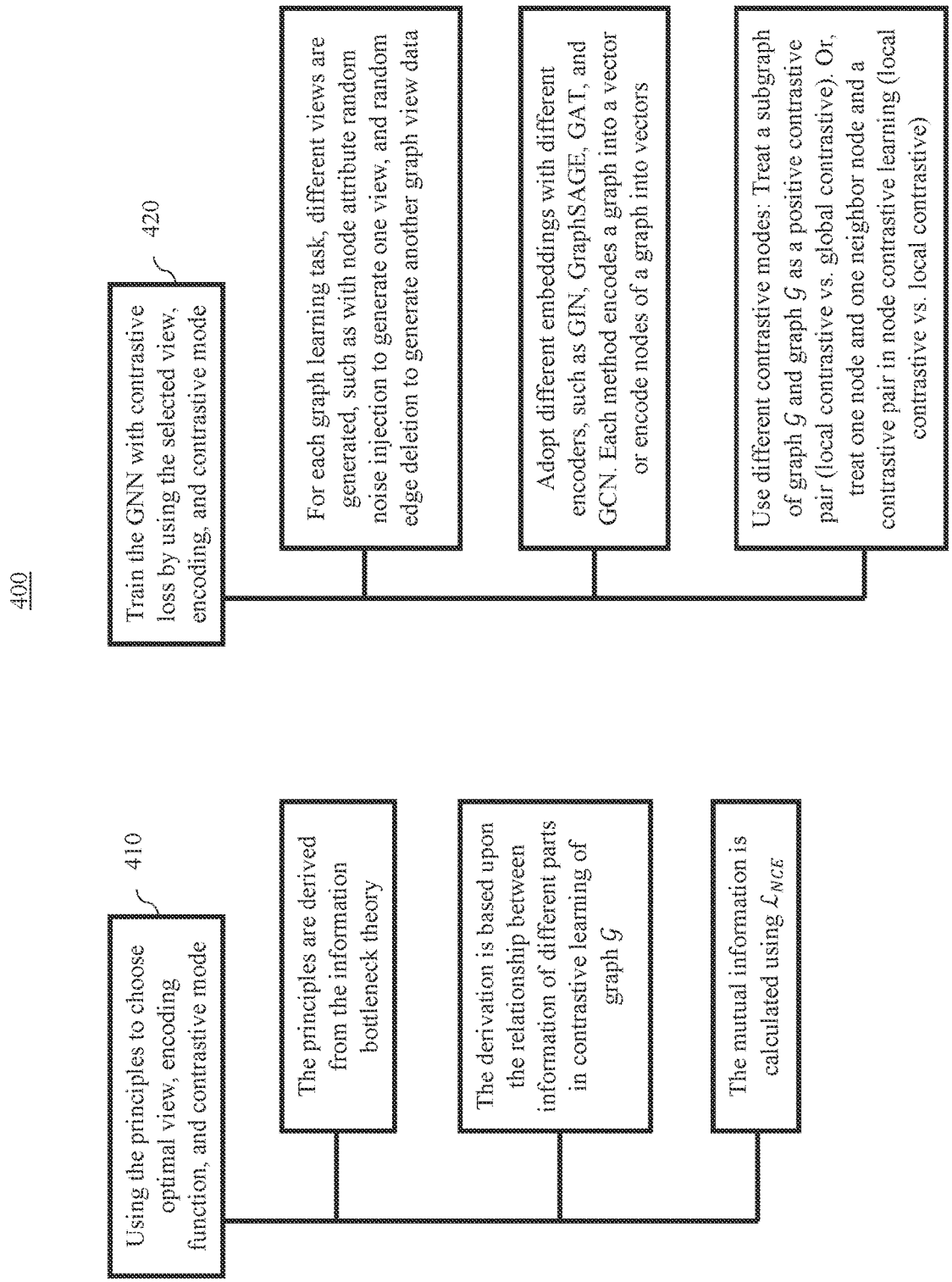
FIG. 4 is a block/flow diagram illustrating a flowchart of the information-aware graph contrastive learning framework (InfoGCL), in accordance with embodiments of the present invention.

FIG. 4 is a block/flow diagram illustrating a flowchart 400 of the information-aware graph contrastive learning framework (InfoGCL), in accordance with embodiments of the present invention.

At block 410, the principles are used to choose the optimal view, the encoding function and the contrastive view. The principles are derived from the information bottleneck theory and the derivation is based upon the relationship between information of different parts in contrastive learning of graph $\mathcal{G}$. The mutual information is calculated using $\mathcal{L}_{NCE}$.

At block 420, the GNN is trained with contrastive loss by using the selected view, the encoding function, and the contrastive mode.

For each graph learning task, different views are generated, such as with node attribute random noise injection to generate one view, and random edge deletion to generate another graph view data. Further, different embeddings with different encoders, such as GIN, GraphSAGE, GAT, and GCN are adopted. Each method encodes a graph into a vector or encodes nodes of a graph into vectors. Moreover, different contrastive modes are used. For example, treat a subgraph of graph $\mathcal{G}$ and graph $\mathcal{G}$ as a positive contrastive pair (local contrastive vs. global contrastive), or treat one node and one neighbor node and a contrastive pair in node contrastive learning (local contrastive vs. local contrastive).

Figure 5:
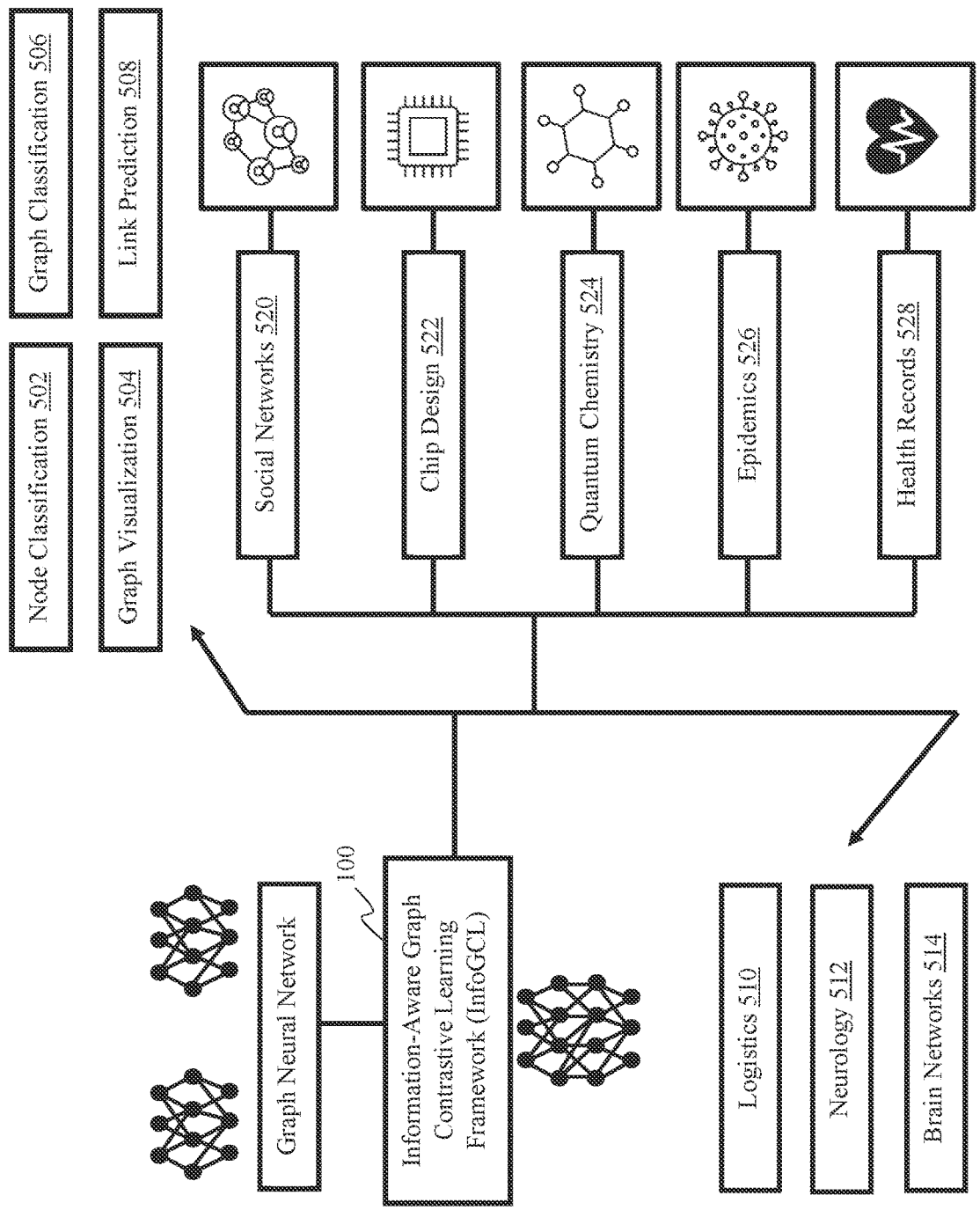
FIG. 5 is a block/flow diagram of exemplary practical applications for implementing the InfoGCL, in accordance with embodiments of the present invention.

FIG. 5 is a block/flow diagram of exemplary practical applications for implementing the InfoGCL, in accordance with embodiments of the present invention.

InfoGCL 100 can be applied to node classification 502, graph visualization 504, graph classification 506, and link prediction 508.

Regarding node classification 502, the task is to determine the labeling samples (represented as nodes) by looking at the labels of their neighbors, usually, problems of this type are trained in a semi-supervised manner, with only a part of the graph being labeled. One example of using node classification is for document classification. Normally, a technical paper also cites other related papers. Intuitively, the cited papers are likely to belong to a similar research area. In this citation network, the exemplary methods can leverage the citation information from each paper in addition to its own textual content. Hence, the dataset has now turned into a network of papers and the node classification using the exemplary embodiments can conduct the paper label prediction.

Regarding graph classification 506, the task is to classify the whole graph into different categories. It's like image classification, but the target changes into the graph domain. The applications of graph classification are numerous and range from determining whether a protein is an enzyme or not in bioinformatics, to categorizing documents in natural language processing (NLP) in which a node is a word or a token of a document or a social network analysis.

Regarding graph visualization 504, this is an area of mathematics and computer science, at the intersection of geometric graph theory and information visualization. It is concerned with the visual representation of graphs that reveals structures and anomalies that may be present in the data and helps users to understand the graphs.

Regarding link prediction 508, the algorithm must understand the relationship between entities in graphs, and it also tries to predict whether there is a connection between two entities. It is beneficial in social networks to infer social interactions or to suggest possible friends to the users. It has also been used in recommender system problems and in predicting criminal associations.

InfoGCL 100 can further be applied to at least logistics 510, neurology 512, and brain networks 514.

InfoGCL 100 can further be applied to at least social networks 520, chip design 522, quantum chemistry 524, epidemics 526, and electrical health records 528.

The exemplary embodiments of the present invention aim to fill the gap by studying how graph information is transformed and transferred during the contrastive learning process and thus introduce the information-aware graph contrastive learning framework (InfoGCL) 100. The exemplary methods employ the Information Bottleneck principle to reduce mutual information between contrastive parts while keeping task-relevant information intact at both the levels of individual module and the entire framework so that the information loss during graph representation learning is minimized.

Figure 6:
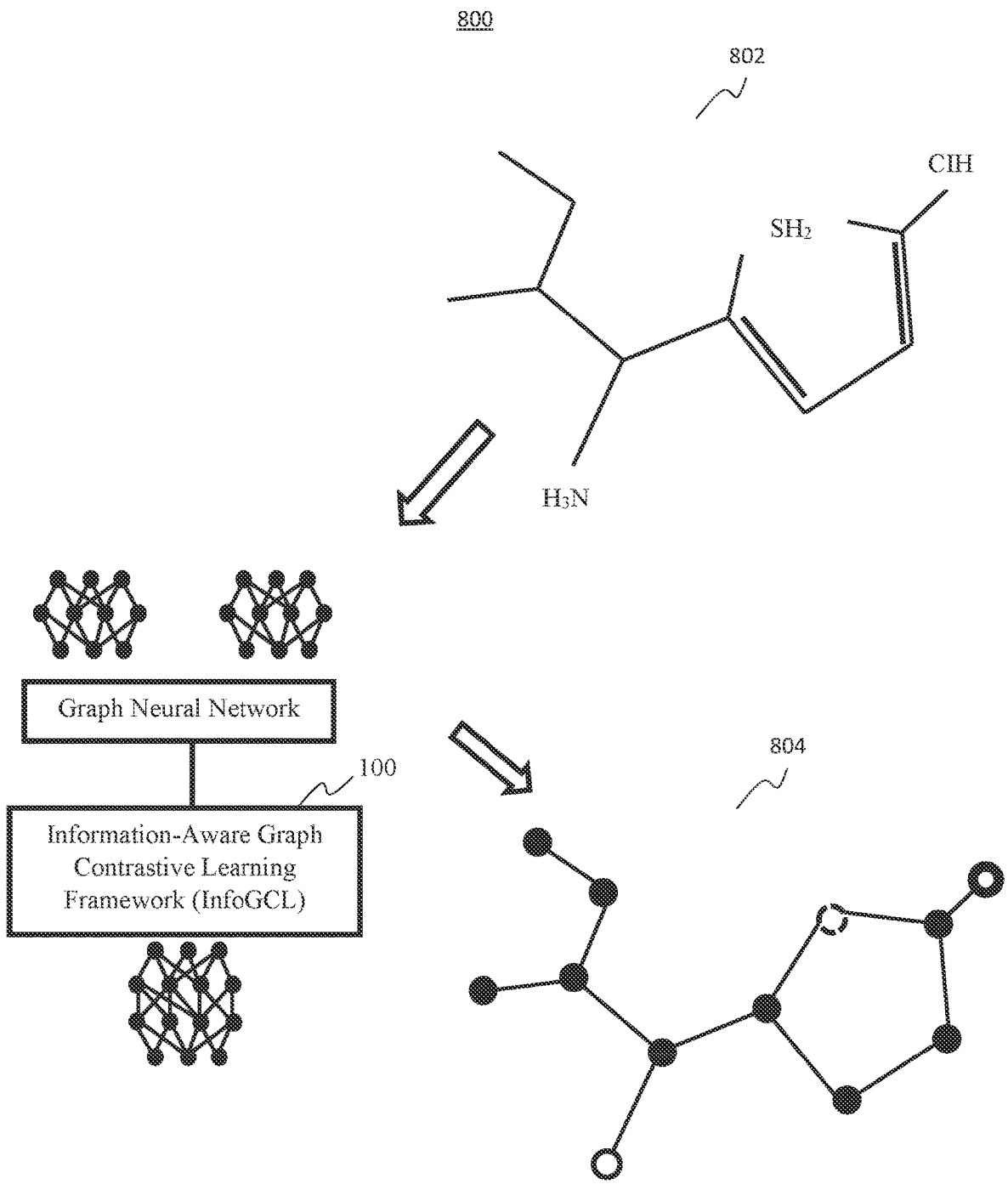
FIG. 6 is an exemplary practical application for performing contrastive learning for graph tasks and datasets by employing an information-aware graph contrastive learning framework, in accordance with embodiments of the present invention.

FIG. 6 is a block/flow diagram 800 of a practical application for performing contrastive learning for graph tasks and datasets by employing an information-aware graph contrastive learning framework, in accordance with embodiments of the present invention.

There are many applications for the proposed invention, such as graph classification and graph node classification, as noted above with reference to FIG. 5. In one specific practical application, graph classification can address drug discovery. For example, the input can be a chemical compound structure 802. The chemical compound is transferred to a graph data 804.

The task is then to train the learning model with such graph data. Each graph in the training data includes a corresponding label (e.g., positive or negative effectiveness of the disease). The trained model can classify the new graph data to predict if the graph (drug) is positive or negative. The exemplary embodiments can significantly improve the classification accuracy of the graph. Moreover, the exemplary methods are also useful for graph node classification. For instance, this is useful for classification of users in a social network, as noted above with reference to FIG. 5.

Figure 7:
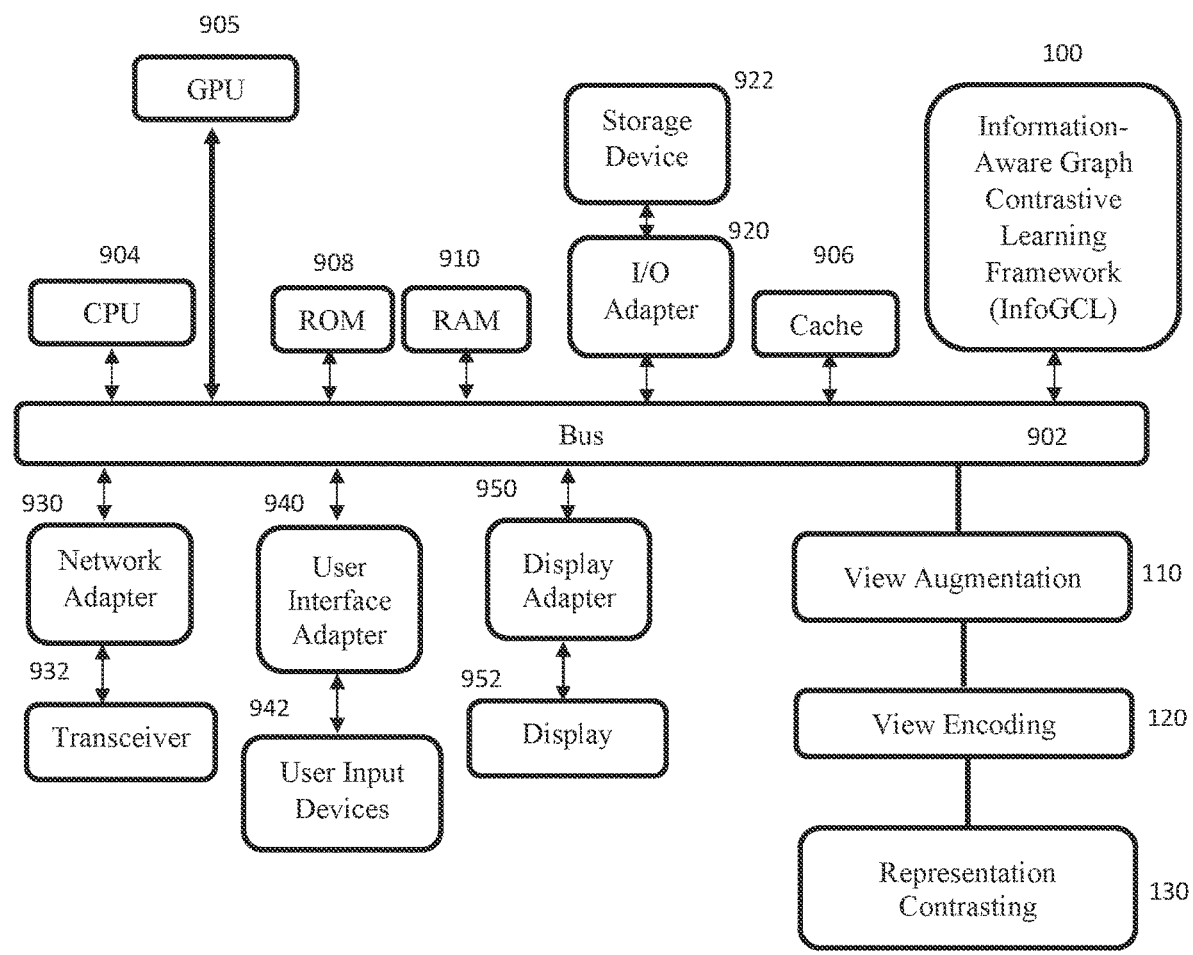
FIG. 7 is an exemplary processing system for performing contrastive learning for graph tasks and datasets by employing an information-aware graph contrastive learning framework, in accordance with embodiments of the present invention.

FIG. 7 is an exemplary processing system for performing contrastive learning for graph tasks and datasets by employing an information-aware graph contrastive learning framework, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, the Information-Aware Graph Contrastive Learning Framework (InfoGCL) 100 can be implemented by a view augmentation component 110, a view encoding component 120, and a representation contrasting component 130.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 8:
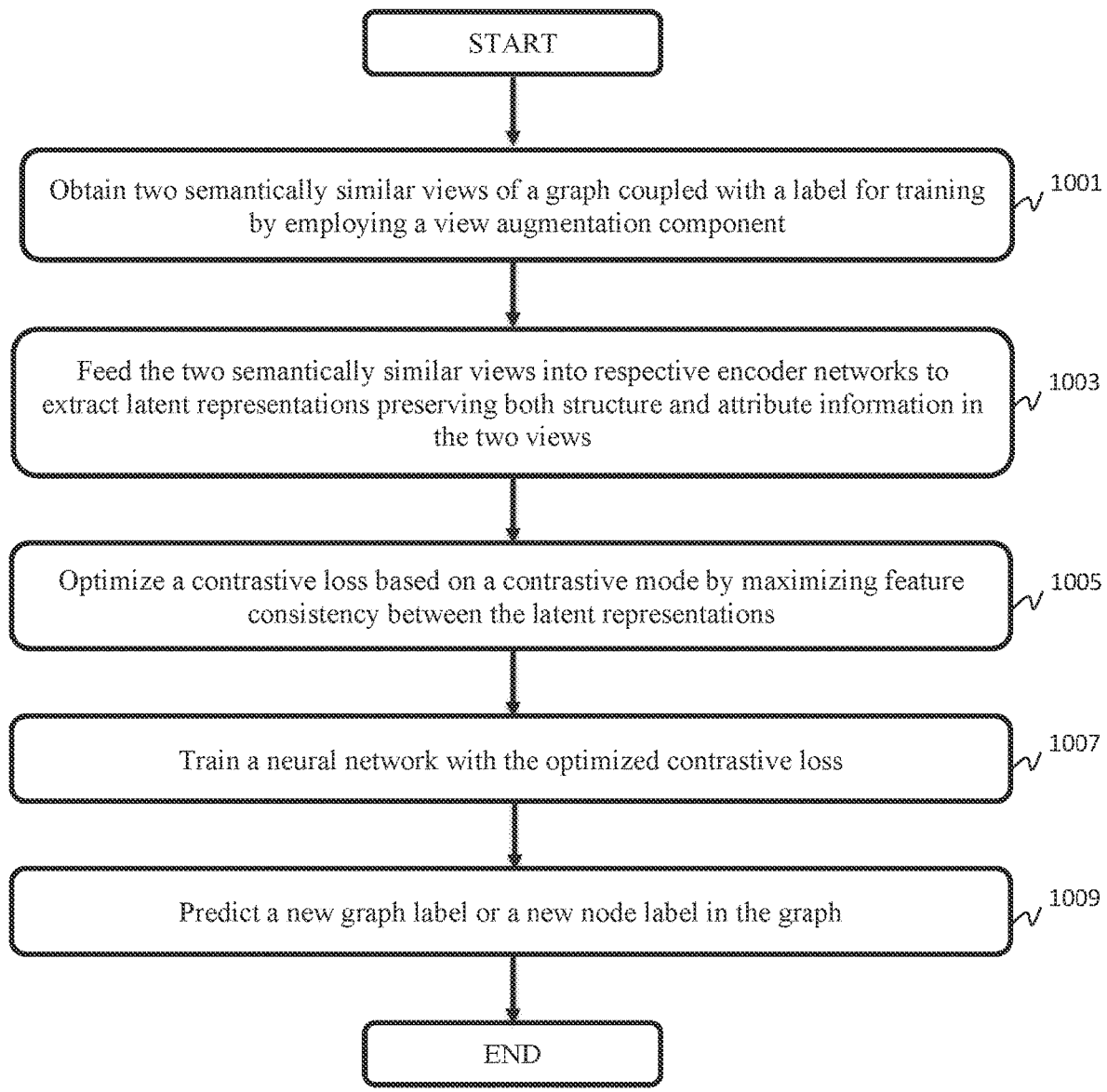
FIG. 8 is a block/flow diagram of an exemplary method for performing contrastive learning for graph tasks and datasets by employing an information-aware graph contrastive learning framework, in accordance with embodiments of the present invention.

FIG. 8 is a block/flow diagram of an exemplary method for performing contrastive learning for graph tasks and datasets by employing an information-aware graph contrastive learning framework, in accordance with embodiments of the present invention.

At block 1001, obtain two semantically similar views of a graph coupled with a label for training by employing a view augmentation component.

At block 1003, feed the two semantically similar views into respective encoder networks to extract latent representations preserving both structure and attribute information in the two views.

At block 1005, optimize a contrastive loss based on a contrastive mode by maximizing feature consistency between the latent representations.

At block 1007, train a neural network with the optimized contrastive loss.

At block 1009, predict a new graph label or a new node label in the graph.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for performing contrastive learning for graph tasks and datasets by employing an information-aware graph contrastive learning framework, the method comprising:
 obtaining two semantically similar views of a graph coupled with a label for training by employing a view augmentation component to generate views of the graph that do not affect a semantic label of the graph;
 feeding the two semantically similar views into respective separate instances of encoder networks to extract latent representations preserving both structure and attribute information in the two semantically similar views;
 selecting a contrastive mode that is characterized by an aggregation operation by solving an optimization problem:

$$(c_i^*, c_j^*) = \underset{(c_i^*, c_j^*)}{\mathrm{argmin}} - I(c_i(z_i^*); c_j(z_j^*))$$

where $c^*i$ and $c^*j$ are aggregation operations applied to latent representations $z^*i$ and $z^*j$ and where $I(.;.)$ is a mutual information;
 minimizing a contrastive loss based on the contrastive mode by maximizing feature consistency between the latent representations;
 training a neural network by performing graph contrastive learning with the minimized contrastive loss; and
 predicting a new graph label or a new node label in the graph using the neural network trained by the graph contrastive learning, wherein the predictive new graph label or new node label is used to support a decision making process.

2. The method of claim 1, wherein each of the separate instances of encoder networks includes a graph neural network (GNN) backbone and a projection multilayer perceptron (MLP).

3. The method of claim 1, wherein the contrastive mode is selected from the group consisting of a global-global mode, a local-global mode, a local-local mode, a multi-scale mode, and a hybrid-mode.

4. The method of claim 3, wherein, in the global-global mode, graph representations from the two semantically similar views are contrasted.

5. The method of claim 3, wherein, in the local-global mode, node representations from the first view of the two semantically similar views are contrasted with graph representations from the second view of the two semantically similar views.

6. The method of claim 3, wherein, in the local-local mode, node representations from the two semantically similar views are contrasted.

7. The method of claim 1, wherein the new graph label and the new node label are classified as either positive or negative.

8. A non-transitory computer-readable storage medium comprising a computer-readable program for performing contrastive learning for graph tasks and datasets by employing an information-aware graph contrastive learning framework, wherein the computer-readable program when executed on a computer causes the computer to perform the steps of:
 obtaining two semantically similar views of a graph coupled with a label for training by employing a view augmentation component to generate views of the graph that do not affect a semantic label of the graph;
 feeding the two semantically similar views into respective separate instances of encoder networks to extract latent representations preserving both structure and attribute information in the two semantically similar views;
 selecting a contrastive mode that is characterized by an aggregation operation by solving an optimization problem:

$$(c_i^*, c_j^*) = \underset{(c_i^*, c_j^*)}{\mathrm{argmin}} - I(c_i(z_i^*); c_j(z_j^*))$$

where $c^*i$ and $c^*j$ are aggregation operations applied to latent representations $z^*i$ and $z^*j$ and where $I(.;.)$ is a mutual information;
 minimizing a contrastive loss based on the contrastive mode by maximizing feature consistency between the latent representations;
 training a neural network by performing graph contrastive learning with the minimized contrastive loss; and
 predicting a new graph label or a new node label in the graph using the neural network trained by the graph contrastive learning, wherein the predictive new graph label or new node label is used to support a decision making process.

9. The non-transitory computer-readable storage medium of claim 8, wherein each of the separate instances of encoder networks includes a graph neural network (GNN) backbone and a projection multilayer perceptron (MLP).

10. The non-transitory computer-readable storage medium of claim 8, wherein the contrastive mode is selected from the group consisting of a global-global mode, a local-global mode, a local-local mode, a multi-scale mode, and a hybrid-mode.

11. The non-transitory computer-readable storage medium of claim 10, wherein, in the global-global mode, graph representations from the two semantically similar views are contrasted.

12. The non-transitory computer-readable storage medium of claim 10, wherein, in the local-global mode, node representations from the first view of the two semantically similar views are contrasted with graph representations from the second view of the two semantically similar views.

13. The non-transitory computer-readable storage medium of claim 10, wherein, in the local-local mode, node representations from the two semantically similar views are contrasted.

14. The non-transitory computer-readable storage medium of claim 8, wherein the new graph label and the new node label are classified as either positive or negative.

15. A system for performing contrastive learning for graph tasks and datasets by employing an information-aware graph contrastive learning framework, the system comprising:
- a memory; and
- one or more processors in communication with the memory configured to:
- obtain two semantically similar views of a graph coupled with a label for training by employing a view augmentation component to generate views of the graph that do not affect a semantic label of the graph;
- feed the two semantically similar views into respective separate instances of encoder networks to extract latent representations preserving both structure and attribute information in the two semantically similar views;
- select a contrastive mode that is characterized by an aggregation operation by solving an optimization problem:

$$(c_i^*, c_j^*) = \underset{(c_i^*, c_j^*)}{\mathrm{argmin}} -I(c_i(z_i^*); c_j(z_j^*))$$

where c*i and c*j are aggregation operations applied to latent representations z*i and z*j and where I(.;.) is a mutual information;
- minimize a contrastive loss based on the contrastive mode by maximizing feature consistency between the latent representations;
- train a neural network by performing graph contrastive learning with the minimized contrastive loss; and
- predict a new graph label or a new node label in the graph using the neural network trained by the graph contrastive learning, wherein the predictive new graph label or new node label is used to support a decision making process.

16. The system of claim 15, wherein each of the separate instances of encoder networks includes a graph neural network (GNN) backbone and a projection multilayer perceptron (MLP).

17. The system of claim 15, wherein the contrastive mode is selected from the group consisting of a global-global mode, a local-global mode, a local-local mode, a multi-scale mode, and a hybrid-mode.

18. The system of claim 17, wherein, in the global-global mode, graph representations from the two semantically similar views are contrasted.

19. The system of claim 17, wherein, in the local-global mode, node representations from the first view of the two semantically similar views are contrasted with graph representations from the second view of the two semantically similar views.

20. The system of claim 17, wherein, in the local-local mode, node representations from the two semantically similar views are contrasted.

* * * * *